(12) United States Patent
Fauser et al.

(10) Patent No.: US 8,990,335 B2
(45) Date of Patent: Mar. 24, 2015

(54) CONTINUOUS FULL SCAN DATA STORE TABLE AND DISTRIBUTED DATA STORE FEATURING PREDICTABLE ANSWER TIME FOR UNPREDICTABLE WORKLOAD

(75) Inventors: Dietmar Fauser, Grasse (FR); Jeremy Meyer, Antibes (FR); Cedric Florimond, Vallauris (FR); Donald Kossmann, Zurich (CH); Gustavo Alonso, Zurich (CH); Georgios Giannikis, Zurich (CH); Philipp Unterbrunner, Zurich (CH)

(73) Assignee: Amadeus S.A.S., Biot (FR)

( * ) Notice: Subject to any disclaimer, the term of this patent is extended or adjusted under 35 U.S.C. 154(b) by 269 days.

(21) Appl. No.: 13/391,701

(22) PCT Filed: Aug. 23, 2010

(86) PCT No.: PCT/EP2010/062223
§ 371 (c)(1),
(2), (4) Date: Apr. 16, 2012

(87) PCT Pub. No.: WO2011/023652
PCT Pub. Date: Mar. 3, 2011

(65) Prior Publication Data
US 2012/0197868 A1    Aug. 2, 2012

(30) Foreign Application Priority Data
Aug. 24, 2009 (EP) .................................... 09305780

(51) Int. Cl.
*G06F 15/167* (2006.01)
*G06F 17/30* (2006.01)

(52) U.S. Cl.
CPC ............................. *G06F 17/30286* (2013.01)

USPC .......... 709/215; 709/201; 709/204; 709/213; 717/136; 707/713; 707/722; 707/736; 707/758; 712/216; 718/101

(58) Field of Classification Search
None
See application file for complete search history.

(56) References Cited

U.S. PATENT DOCUMENTS

| | | | |
|---|---|---|---|
| 5,873,075 A | 2/1999 | Cochrane et al. | |
| 5,875,329 A * | 2/1999 | Shan | 719/314 |
| 6,345,267 B1 * | 2/2002 | Lohman et al. | 1/1 |

(Continued)

OTHER PUBLICATIONS

Wang et al, "LifeRaft: Data-Driven, Batch Processing for the Exploration of Scientific Databases", Jan. 2009.*

(Continued)

*Primary Examiner* — Hung Le
(74) *Attorney, Agent, or Firm* — Wood, Herron & Evans, LLP

(57) ABSTRACT

A method for storing and retrieving data in a storage node of a data store and storage node of a data store, storing in main-memory at least one segment of a relational table. The storage node includes at least one computational core running at least one scan thread each dedicated to the scanning of one of the at least one segment. At least one scan thread uniquely, continuously and exhaustively scans the dedicated segment of the relational table. The storage node receives and processes batches of query and update operations for the at least one segment of the relational table. The query and update operations of a batch are re-indexed at beginning of each scan by the scan thread. Then, the indexed query and update operations of a batch are independently joined to data records of said segment that match with predicates of the indexed query and update operations.

27 Claims, 8 Drawing Sheets

(56) References Cited

U.S. PATENT DOCUMENTS

| | | | |
|---|---|---|---|
| 6,349,310 B1* | 2/2002 | Klein et al. | 707/703 |
| 6,405,198 B1* | 6/2002 | Bitar et al. | 1/1 |
| 6,470,331 B1* | 10/2002 | Chen et al. | 707/718 |
| 6,622,155 B1* | 9/2003 | Haddon et al. | 718/100 |
| 6,795,817 B2* | 9/2004 | Agarwal et al. | 1/1 |
| 7,039,661 B1 | 5/2006 | Ranade | 707/204 |
| 7,146,365 B2* | 12/2006 | Allen et al. | 1/1 |
| 8,095,657 B2* | 1/2012 | E et al. | 709/226 |
| 8,245,207 B1* | 8/2012 | English et al. | 717/149 |
| 8,627,331 B1* | 1/2014 | Grunwald et al. | 718/106 |
| 2003/0208511 A1* | 11/2003 | Earl et al. | 707/204 |
| 2005/0071320 A1* | 3/2005 | Chkodrov et al. | 707/3 |
| 2005/0076068 A1 | 4/2005 | Fowler et al. | 707/201 |
| 2007/0203958 A1 | 8/2007 | Suzuki et al. | 707/204 |
| 2007/0255997 A1* | 11/2007 | Xiao et al. | 714/762 |

OTHER PUBLICATIONS

"Cooperative Scans: Dynamic Bandwidth Sharing in a DBMS", Marcin Zukowski et al., In Proc. VDLB'07, 2007, pp. 723-734.

"A Linear-Time Probabilistic Counting Algorithm for Database Applications", Kyu-Young Whang et al., ACM TODS, 15(2), 1990, pp. 208-229.

"Multiple-Query Optimization", Timos K. Sellis, ACM Transactions on Database Systems, vol. 13, No. 1, Mar. 1988, pp. 23-52.

"Probabilistic counting Algorithms for Data Base Applications", Philippe Flajolet, Journal of Computer and System Science, vol. 31, No. 2, Oct. 1985, pp. 185-209.

"Streaming Queries over Streaming Data", Sirish Chandrasekaran, et al., In Proc. VLDB '02, 2002, 12 pgs.

"R-Trees a Dynamic Index Structure for Spatial Searching", Antonin Guttman, In Proc. SIGMOD'84, 1984, pp. 47-57.

"Database Architecture Optimized for the new Bottleneck: Memory Access", Peter Boncz et al., Proceedings of the 25$^{th}$ VLDB Conference, 1999, pp. 54-65.

"A Study of the Behavior of the Read: Write Ratio Under Two-Phase Locking Schemes", Vijay Kumar, Information Systems, vol. 14, No. 1, 1989, pp. 1-12.

"PriorArtDatabase", ip.com, IBM, Oct. 8, 2008, 4 pgs.

"Method for Automatically Switching Between Read and Write (shared and exclusive) Locks on a Resource while Guaranteeing Deadlock Avoidance" IP.Com Journal, 20081008 IP.Com Inc., West Henrietta, NY US.

Wulf, W.A.; McKee, S.A., "Hitting the Memory Wall: Implications of the Obvious." ACM Sigarch Comput. Archit. News vol. 23, No. 1, 1995, pp. 20-24.

Harizopoulos, S. et al. "Qpipe: a Simultaneous Pipelined Relational Queary Engine," Proc. Sigmod '05 2005.

Raman, V., "Constant-Time Query Processing," Proc. ICDE '08 2008.

Fabret, F. "Filtering Algorithms and Implementation for Very Fast Publish/Subscribe Systems," Proc. Sigmod '01 2001.

A. Guttman. R.-Trees, "A Dynamic Index Structure for Spatial Searching," Proc. Sigmod '84 1984.

Mohan, C., "Aries: a Transaction Recovery Method supporting Fine-Granularity Locking and Partial Rollbacks Using Write-Ahead Logging," ACM TODS vol. 17, 1992, p. 94.

European Search Report for Application No. Ep/09305780, Nov. 16, 2009.

International Search Report and Written Opinion for Application No. PCT/EP2010/062223, Mar. 11, 2011.

Unterbruner, P.; Giannikis, G.; Alonso, G., Fauser, D; and Kossmann, D. "Predictable Performance for Unpredictable Workloads" (12 pages).

State Intellectual Property Office of the People's Republic of China, Office Action issued in related application serial No. 201080047405. 0, dated Jul. 24, 2014.

State Intellectual Property Office of the People's Republic of China, Written Opinion issued in related application serial No. 201080047405.0, dated Jan. 09, 2014.

State Intellectual Property Office of the People's Republic of China, Written Opinion issued in related application serial No. 201080047405.0, dated Apr. 22, 2013.

* cited by examiner

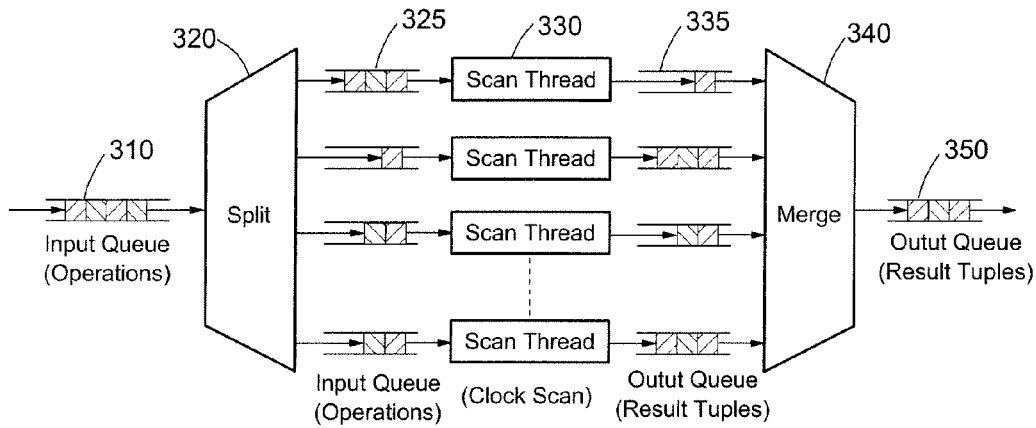

Algorithm 1: Classic Scan Thread ———— Prior Art ——— 410

Data: Segment *seg*
Data: OpQueue *iq*;       // *input query and update queue*
Data: ResultQueue *oq*;       // *output queue*
while *true* do
    Op *op* ← *iq*.get();       //*activate a single operation*
    //*scan the full segment, slot-wise*
    foreach Slot *s* ∈ *seg* do Execute(*op*, *s*, *oq*)
    Put(*oq*, EndOfStream(*op*));    //*deactivate the operation*

---

Algorithm 2: Elevator Scan Thread ———— Prior Art ——— 420

Data: Segment *seg*
Data: OpQueue *iq*;       // *input query and update queue*
Data: OpQueue *aq*;       // *active query and update queue*
Data: ResultQueue *oq*;       // *output queue*
while *true* do
    //*scan the full segment, slot-wise*
    foreach Slot *s* ∈ *seg* do
        //*execute all active operations against the slot*
        foreach Op *op* ∈ *aq* do Execute(*op*, *s*, *oq*)
        //*deactivate all operations that finished a full scan*
        while Finished(Peek(*aq*)) do
            Put(*oq*, EndOfStream(Get(*aq*)))
        //*activate all operations in the input queue*
        while ¬IsEmpty(*iq*) do Put(*aq*, Get(*iq*))

Algorithm 3: Clock Scan Thread

Data: MultiQueryOptimizer *opt*
Data: Segment *seg*
Data: OpQueue *iqq, iuq*;  // *input query and update queues*
Data: ResultQueue *oq*;  // *output queue*
while *true* do
    //*activate all updates in input update queue*
    UpdateSet *us* ← ∅
    while ¬IsEmpty(*iuq*) do Put(*us*, Get(*iuq*))
    //*activate all queries in input query queue*
    QuerySet *qs* ← ∅
    while ¬IsEmpty(*iqq*) do Put(*qs*, Get(*iqq*))
    //*do multi-query optimization*
    UpdatePlan *up* ← PlanUpdates(*opt, us*)
    QueryPlan *qp* ← PlanQueries(*opt, qs*)
    //*scan the full segment, chunk-wise*
    foreach Chunk *c* ∈ *seg* do
        Join(*up, c, oq*);  //*update-data join*
        Join(*qp, c, oq*);  //*query-data join*
    //*deactivate all active operations*
    foreach Op *op* ∈ *qs* ∪ *us* do Put(*oq*, EndOfStream(*op*))

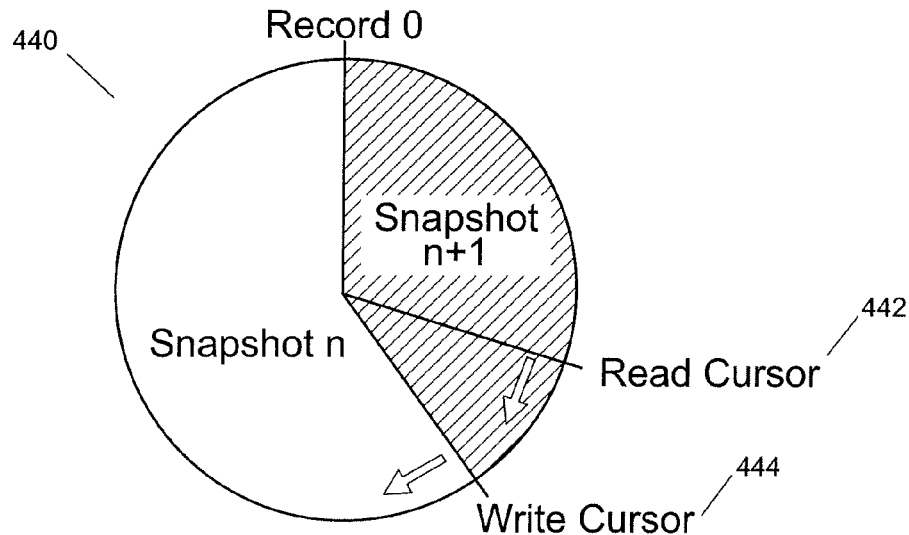

Figure 4b

Algorithm 4: Index Union Join
Input: Chunk c
Input: IndexSet is;                          // predicate indexes
Input: QuerySet qs;                          // unindexed queries
Input: ResultQueue oq;                       // output queue
foreach Record $r \in c$ do
  //probe the indexes for candidates
  foreach Index $i \in is$ do
    QuerySet $C \leftarrow$ Probe($i$, $r$);   //candidate queries
    foreach Query $q \in C$ do Execute($q$, $r$, $oq$)
  //execute unindexed queries
  foreach Query $q \in qs$ do Execute($q$, $r$, $oq$)

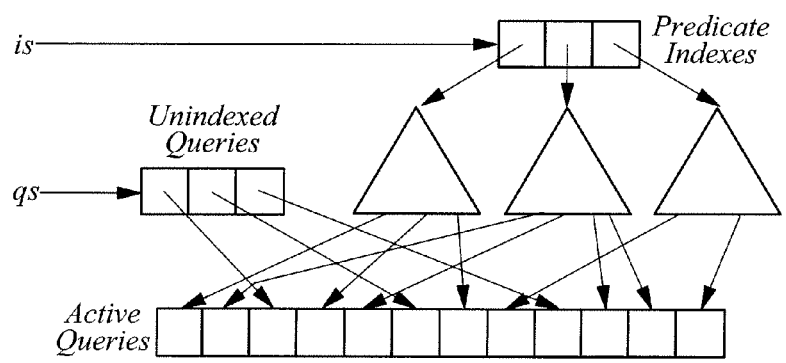

Figure 5a

| Algorithm 5: Index Union Update Join | 540 |
|---|---|

Input: Chunk $c$
Input: IndexSet $is$;                                  // predicate indexes
Input: UpdateSet $us$;  // unindexed UPDATEs, DELETEs
Input: InsertQueue $iq$;                                      // INSERTs
Input: ResultQueue $oq$;                                // output queue
foreach Slot $s \in c$ do
    Timestamp $t \leftarrow 0$
    while $t < \infty$ do
        if IsOccupied($s$) then
            //slot is occupied; perform updates
            $t \leftarrow$ PerfUpdates($s, t, is, us$)
        else if $\neg$IsEmpty($iq$) then
            //slot not occupied, have insert; execute it
            Insert $i \leftarrow$ Get($iq$)
            Execute($i, s$)
            $t \leftarrow i.timestamp + 1$
        else $t \leftarrow \infty$;       //not occupied, no insert; next slot

| Function PerfUpdates(Slot $s$, Timestamp $t$, IndexSet $is$, UpdateSet $us$): Timestamp | 550 |
|---|---|

UpdateSet $C \leftarrow us$;                            //candidate set
UpdateSet $M \leftarrow \emptyset$;                             //match set
//probe indexes for additional candidates
foreach Index $i \in is$ do  $C \leftarrow C \cup$ Probe($i, s.record$)
//find matches among candidates
foreach Update $u \in C$ do
    if Matches($u, s.record$) then  $M \leftarrow M \cup \{u\}$
if $M \neq \emptyset$ then
    //execute match with lowest timestamp
    Update $u \leftarrow \min_{u.timestamp}\{u \in M\}$
    if $u.timestamp \geq t$ then
        Execute($u, s$)
        if IsDelete($u$) then
            return $u.timestamp + 1$;   //slot empty; return
        else
            //slot updated; recurse
            return PerfUpdates($s, u.timestamp + 1, is, us$)
return $\infty$

Figure 5c

610 — Algorithm 7: Multi-Query-Optimizer

Data: Gain *thresh*;  // minimum gain threshold
Input: OpSet *os*;  // active queries/updates
Input: AttributeSet *A*;  // indexable attributes in schema
Output: IndexSet *is* ← ∅;  // predicate indexes
QuerySet *uos* ← *os*;  // unindexed queries/updates
repeat
    Attribute $a \leftarrow \max_{\text{Gain}(a)}\{a \in A\}$
    Gain $g \leftarrow \text{Gain}(a)$
    if $g \geq thresh$ then
        Index $idx \leftarrow \text{BuildIndex}(a, uos)$
        $is \leftarrow is \cup idx$
        $uos \leftarrow uos \setminus \{q \in idx\}$
        $A \leftarrow A \setminus \{a\}$
until $g < thresh$ 620 — $$gain(Q, a) := \sum_{q \in Q} 1 - selectivity(a, q)$$

Figure 6

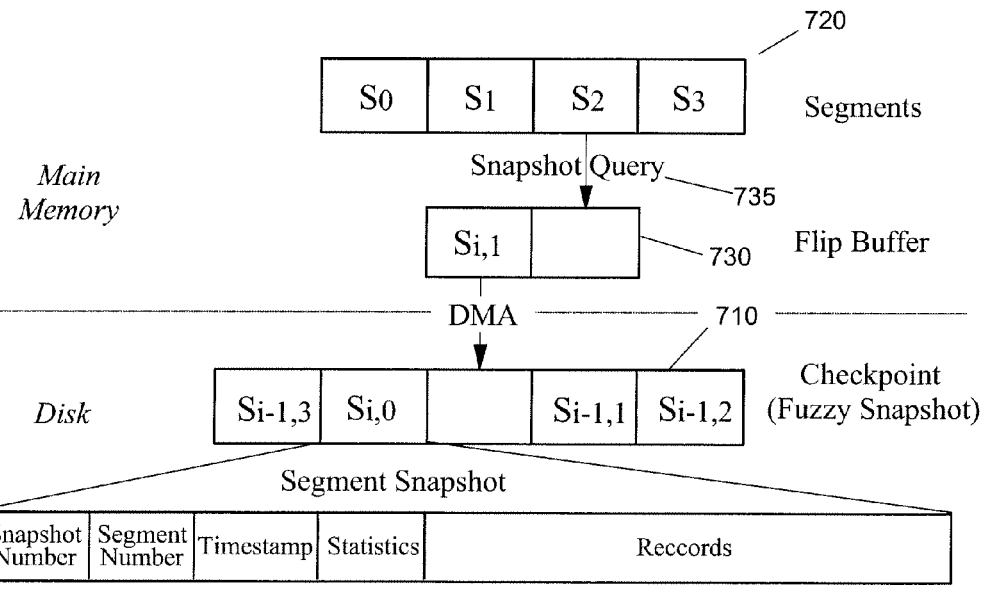

Figure 7

CONTINUOUS FULL SCAN DATA STORE TABLE AND DISTRIBUTED DATA STORE FEATURING PREDICTABLE ANSWER TIME FOR UNPREDICTABLE WORKLOAD

FIELD OF THE INVENTION

The present invention relates in general to data stores and data management systems operated in a distributed computing environment. More specifically, the present invention relates to data stores comprising a storage scan engine operating in main-memory of multiple storage nodes each holding a segment of a single, possibly very large, relational table, and capable of handling together large numbers of concurrent queries and updates while guaranteeing access latency and data freshness.

BACKGROUND OF THE INVENTION

In the last decade the requirements faced by traditional relational database applications have changed significantly. Most importantly, databases must operate with predictable performance and low administration cost. Furthermore, databases must be able to handle diverse, evolving workloads as applications are constantly extended with new functionality and new data services are deployed, thereby adding new types of queries to the workload in an unpredictable way. Most notably, these new requirements have been expressed in the context of well known commercial platforms with a worldwide presence such as eBay, Amazon, Salesforce, etc. The latter, for instance, allows users to customize their application and define their own queries. Providing such a platform involves highly diverse query workloads; yet, users of the platform expect a constant response time. Unfortunately, throughput and latency guarantees are difficult to make with traditional database systems. These systems are designed to achieve best performance for every individual query. To this end, they rely on sophisticated query optimizers and skilled administrators for selecting the right indexes and materialized views. Such complex systems are expensive to maintain and do not exhibit predictable performance for unpredictable, evolving workloads.

It is thus an object of the invention to overcome the above limitations in disclosing a scalable, distributed relational table and storage full-scan engine capable of sustaining large numbers of diverse queries and updates with guaranteed access latency and data freshness irrespective of the types of workload and queries they have to deal with.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The above objects are met by the invention which describes a method for storing and retrieving data in a storage node of a data store comprising the step of storing at least one segment of a relational table in data storage means of the storage node, the data storage means comprising at least a processor core and its associated main memory. The method comprises the following steps: storing in each associated main memory of a processor core a single associated segment;
    running from the processor core one scan thread dedicated to the scanning of the said associated segment;
    continuously and fully scanning said associated segment;
    receiving and processing batches of query and update operations;
    indexing query and update operations of a batch at beginning of each data scan;
    joining query and update operations of a batch to retrieved data records of said associated segment of the relational table that match with predicates of the indexed query and update operations;
    progressively fulfilling query and update operations of a batch whenever data of the joined data records are retrieved by the scan thread while scanning said associated segment of the relational table; thereby, maximizing the sharing and access of data records in main-memory.

Advantageously, it is the action of joining the indexed query-predicates with the data records that selects which records are retrieved. What is indexed is the set of predicates of the queries and update operations.

The method according to the invention may also include any one of the following optional features:
    Each scan thread executes a clock scan algorithm comprising:
    a write cursor and a read cursor exhaustively arranged to scan said segment of the relational table in order to process, at each scan cycle, respectively, all pending query and update operations of a batch;
    wherein the write and read cursors allow data records of the relational table segment to be written before the read cursor can read them;
    wherein all query operations are activated at beginning of a scan cycle;
    wherein all update operations are either fully applied or not at all to data records of the relational table segment; thereby, providing for consistency of the relational table segment.
    The update operations include modifying, deleting and inserting data records from/into the segment.
    Operations are time stamped and are kept processed in total order by the scan thread.
Building of Internal Statistics, Query Indexing, and Aggregating Queries.
    While scanning the relational table segment, internal statistics are gathered by scan threads which each counts a number of records, a number of null values, and a number of distinct values currently found for a given attribute of the segment. Internal statistics are Clock Scan tools used to steer the building of query indexes.
    For handling aggregating user queries, computations including: summing attribute values, finding an attribute minimum value, finding an attribute maximum value, and counting number of non-null values, are further performed by the aggregation layer in cooperation with the storage nodes holding the relevant segments.
    Therefore the full scan allows both building internal statistics for indexing queries and fulfilling queries that necessitate aggregation of data records or values of data records.
Durability
    The scan thread builds a snapshot of data records while scanning the relational table segment and wherein the snapshot of data records is stored when complete in a durable memory. If N is the number of slots in main memory then N+1 segment slots are stored in the durable memory. Hence, if the hosting machine crashes, this is only the current segment, i.e., the one being written, which is lost and N valid segments are still available. The checkpoint is made segment per segment. This is referred to as fuzzy-checkpoint.

A logical log file of current transactions is maintained by the scan thread while scanning the relational table segment.

Advantageously, durability of the main-memory is obtained by reloading the last complete snapshot and replaying the log file of current transactions.

The main-memory is comprised of non-durable on-board banks of memory tightly linked to the processing units of a storage node.

The relational table segment is entirely comprised and stays resident in the main-memory.

Additionally, the scan thread is forced to execute in a designated processor core and is fetching data from the relational table segment in chunks of size compatible with one or more levels of memory caches dedicated to the designated processor core to prevent cache misses.

Another subject matter of the invention is a storage node of a data store and data management system, comprising data storage means having a main-memory and arranged for storing in the main-memory a plurality of segments of a relational table, characterized in that the storage node comprises at least one processor core associated to each segment and configured for running at least one scan thread dedicated to the scanning of said associated segment, the storage node being arranged so that:

each scan thread uniquely, continuously and fully scans the dedicated segment;

for each segment, the storage node receives and processes batches of query and update operations;

the query and update operations of a batch are re-indexed at beginning of each scan by the scan thread;

the indexed query and update operations of a batch are independently joined to data records of the relational table segment that match with predicates of the indexed query and update operations, and at least some data of the data records for which query and update operations are joined are retrieved, the indexed query and update operations of a batch are progressively fulfilled whenever data of the joined data records are retrieved by the scan thread while scanning the relational table segment;

thereby, maximizing the sharing and access of data records in main-memory.

Another subject matter of the invention is a distributed data store comprising:

a storage layer comprised of a plurality of storage nodes according to any the previous features;

an aggregation layer comprised of aggregator nodes aimed at routing batches of query and update operations to the storage nodes and merging results returned by the storage nodes.

Optionally, the data store according to the invention may also include any one of the following features:

The storage layer is organized in groups of storage nodes. Each storage node is storing as many segments as its number of computational cores. The set of all segments held by a storage node constitutes a segment set. All storage nodes of a group store identical segment sets.— each storage node of a group is a replica of the other storage nodes of the same group, this is a distributed replicated data store.

According to a specific embodiment, one storage node of a group is a master node and the other storage nodes are replication nodes, the master node of a replication group being arranged to cluster and forward incoming queries to different replication nodes.

Advantageously, the distributed data store is arranged for extracting values from the records while scanning each segment; aggregating these values; performing at least any one of the following computing: summing attribute values, finding an attribute minimum value and finding an attribute maximum value, counting number of non null values; fulfilling a query by providing the result of the calculation performed on said aggregated values.

The different replication groups store different segment sets of the relational table.

Replication groups are specialized to handle specific query operations.

The aggregation layer is arranged to only route specific batches of query and update operations to corresponding specialized storage nodes.

The distributed data store is configured so that specialized storage nodes are organized to expedite processing of equality-like and range-like predicates.

According to another aspect, the invention relates to a scanning system in a computerized distributed environment for exhaustively scanning at least one memory segment of a database relational table during successive continuous scanning cycles, the scanning system comprising:

a first and a second cursor adapted to exhaustively scan the at least one memory segment at each scanning cycle and to process pending update and query database operations, wherein the first cursor is a write cursor configured to write into the at least one memory segment and process database operations aimed at updating data records into the relational table, wherein the second cursor is a read cursor configured to read out from the at least one memory segment relational table data records in response to a query, the scanning system characterized in that the first cursor is further configured to write relational table data records into the at least one memory segment before the second cursor can read them, and in that the time delay between the first cursor writing and the second cursor reading is less than one scanning cycle.

In optional embodiments which can be implemented in association or alternatively, such the scanning system is such that:

query database operations are reordered to perform query-data joins;

the database update operations include updating, deleting and inserting relational table data records into the at least one memory segment;

database update operations are processed in their order of arrival;

query and update database operations are reordered to perform query/update-data joins;

it is configured to process at least a query and an update during a same cycle.

it is configured to index operations at the beginning of a cycle;

said cursors are logical cursors integrated in one single physical cursor;

the required time for processing a database operation is predictable and independent of the operation types and workload.

The invention also relates to a system for data processing comprising at least a CPU, a database and the scanning system as previously introduced. This system may comprises at least one of the following optional features:

it comprises split and merge functions and wherein an initial operation is configured to be split into a number of sub-operations;

the number of sub-operations is depending on the performance and number of CPUs and main memories;

the scanning system is configured to scan said sub-operations independently and to output a sub-result for each of said performed scans;

the outputted sub-results for each of said performed scan are merged together to provide a result output for the initial operations.

Finally, the invention discloses a scanning method in a computerized distributed environment for exhaustively scanning at least one memory segment of a database relational table during successive continuous scanning cycles, the scanning system comprising the steps of:

exhaustively scanning, with a first and a second adapted cursor, at least one memory segment at each scanning cycle and to process pending update and query database operations, wherein the first cursor is a write cursor configured to write into the at least one memory segment and process database operations aimed at updating data records into the relational table, wherein the second cursor is a read cursor configured to read out from the at least one memory segment relational table data records in response to a query, the scanning method characterized in that the first cursor is further configured to write relational table data records into the at least one memory segment before the second cursor can read them, and in that the time delay between the first cursor writing and the second cursor reading is less than one scanning cycle.

BRIEF DESCRIPTION OF THE DRAWINGS

FIG. 3 visualizes the architecture of a storage node according to the invention.

FIG. 4 discusses the algorithm which continuously scans the data in a separate thread of control and compares the scan algorithm of the invention (FIG. 4b) to algorithms of the prior art (FIG. 4a).

FIG. 6 discusses the multi-query optimizer aimed at planning the joins described in previous figure and further shows how query indexes are built.

FIG. 7 discusses durability of a data store according to the invention.

DETAILED DESCRIPTION

Figure 1:
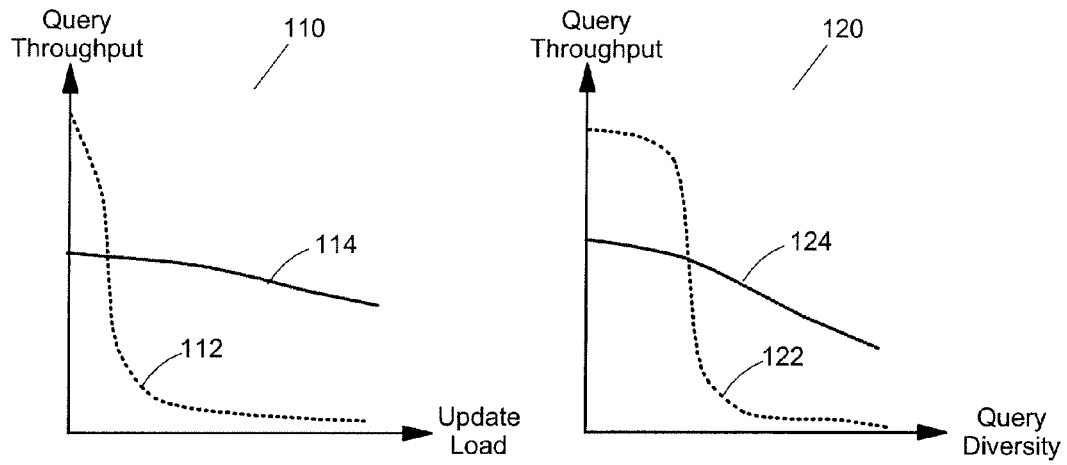
FIG. 1 illustrates and further discusses the objective of the invention.

The following detailed description of the invention refers to the accompanying drawings. While the description includes exemplary embodiments, other embodiments are possible, and changes may be made to the embodiments described without departing from the spirit and scope of the invention.

A glossary of terms and references used to describe the invention is provided hereafter.

ACID: In computer science, ACID (Atomicity, Consistency, Isolation, and Durability) is a set of properties that guarantee that database transactions are processed reliably. In the particular context of the invention a transaction is only made up of one operation and not many as it would be possible with other data store systems. This includes all query and update operations that are issued by the end-users. Atomicity refers to the ability of the DBMS (Database Management System) to guarantee that either all of the tasks of a transaction are performed or none of them are. Atomicity states that database modifications must follow an "all or nothing" rule. Each transaction is said to be "atomic" if one part of the transaction fails, the entire transaction fails. It is critical that the database management system maintain the atomic nature of transactions in spite of any DBMS, operating system or hardware failure. The Consistency property ensures that the database remains in a consistent state before the start of the transaction and after the transaction is over, whether it is successful or not. In a data store system according to the invention consistency is only granted at segment level. In general, consistency states that only valid data will be written to the database. If, for some reason, a transaction is executed that violates the database's consistency rules, the entire transaction will be rolled back and the database will be restored to a state consistent with those rules. On the other hand, if a transaction successfully executes, it will take the database from one state that is consistent with the rules to another state that is also consistent with the rules. Isolation refers to the requirement that other operations cannot access or see the data in an intermediate state during a transaction. This constraint is required to maintain the performance as well as the consistency between transactions in a DBMS. Thus, each transaction is unaware of another transactions executing concurrently in the system. In data store according to the invention this is automatically granted since there is, as mentioned above, only one operation executed per transaction. Durability refers to the guarantee that once the user has been notified of success, the transaction will persist, and not be undone. This means it will survive system failure, and that the database system has checked the integrity constraints and won't need to abort the transaction. Many databases implement durability by writing all transactions into a transaction log that can be played back to recreate the system state right before a failure. A transaction can only be deemed committed after it is safely in the log. Durability does not imply a permanent state of the database. Another transaction may overwrite any changes made by the current transaction without hindering durability.

Aggregator: Routing node of a system according to the invention not hosting data but able to dispatch queries and operations over storage nodes and to perform higher order processing on the data before sending back to the client.

Cache locality: Locality of reference, also called principle of locality, is the phenomenon of the same value or related storage locations being frequently accessed. There are two basic types of reference locality. Temporal locality refers to the reuse of specific data and/or resources within relatively small time durations. Spatial locality refers to the use of data elements within relatively close storage locations. Temporal locality: if at one point in time a particular memory location is referenced, then it is likely that the same location will be referenced again in the near future. There is a temporal proximity between the adjacent references to the same memory location. In this case it is advantageous to make efforts to store a copy of the referenced data in special memory storage, which can be accessed faster. Temporal locality is a very special case of the spatial locality, namely when the prospective location is identical to the present location. Spatial locality: if a particular memory location is referenced at a particular time, then it is likely that nearby memory locations will be referenced in the near future. There is a spatial proximity between the memory locations, referenced at almost the same time. In this case it is advantageous to make efforts to guess, how big neighborhood around the current reference is worthwhile to prepare for faster access. Hierarchical memory is a hardware optimization that takes the benefits of spatial and temporal locality and can be used on several levels of the memory hierarchy. A cache is a simple example of exploiting temporal locality, because it is a specially designed faster but smaller memory area, generally used to keep recently referenced data and data near recently referenced data, which can lead to potential performance increases.

Clock Scan: The name of the main algorithm which behaves by cyclically scanning the data, as if the data were spread on a clock. There are two scanning cursors, a read and a write cursor, that represent hands of the clock.

Data record: A row of a relational table, or a row of a relation, that possibly contains a defined value for each column of the table. The value is NULL if no entry has been done in a column of that row. Any comparison involving a NULL value returns an UNKNOWN status. See the definition of 'Predicate' hereafter. A data record is also referred to, in the following description, as a tuple, i.e., a set of n values where n is the number of defined columns of the corresponding relational table. Some of these tuple values are possibly null values. Also, in the following description of the invention a column item is said to be an attribute of the corresponding row table or data record.

Greedy algorithm: A greedy algorithm is any algorithm that follows the problem-solving heuristic technique of making the locally optimal choice at each stage with the hope of finding the global optimum.

Hard Processor Affinity: Carry out the idea of, e.g.: "always runs this process on processor one" or "run these processes on all processors but processor zero". The scheduler then obeys the order, and the process runs only on the allowed processors. There are two types of CPU (central processing unit) affinity. The first one, soft affinity, also called natural affinity, is the tendency of a scheduler to try to keep processes on the same CPU as long as possible. It is merely an attempt; if it is ever infeasible, the processes certainly will migrate to another processor. This behavior results in the ping-pong effect. The scheduler bounces processes between multiple processors each time they are scheduled and rescheduled. Hard affinity, on the other hand, is what a CPU affinity system call provides. It is a requirement, and processes must adhere to a specified hard affinity. If a processor is bound to CPU zero, for example, then it can run only on CPU zero.

Horizontal, Vertical partitioning: A partition is a division of a logical database or its constituting elements into distinct independent parts. Database partitioning is normally done for manageability, performance or availability reasons. Also, it allows the data store to scale. Horizontal partitioning involves putting different rows into different tables. Vertical partitioning involves creating tables with fewer columns and using additional tables to store the remaining columns. This type of partitioning is called "row splitting", i.e., the row is split by its columns.

Materialized View: In a database management system following the relational model, a view is a virtual table representing the result of a database query. Whenever an ordinary view's table is queried or updated, the DBMS converts these into queries or updates against the underlying base tables. A materialized view takes a different approach in which the query result is cached as a concrete table that may be updated from the original base tables from time to time. This enables much more efficient access, at the cost of some data being potentially out-of-date. It is most useful in data warehousing scenarios, where frequent queries of the actual base tables can be extremely expensive. In addition, because the view is manifested as a real table, anything that can be done to a real table can be done to it, most importantly building indexes on any column, enabling drastic speed-ups in query time. In a normal view, it's typically only possible to exploit indexes on columns that come directly from, or have a mapping to, indexed columns in the base tables; often this functionality is not offered at all.

NUMA: (Non-Uniform Memory Access) A multiprocessing architecture in which memory is separated into close and distant banks. On NUMA and SMP (Shared Memory Processing) architectured machines, all the multiple CPUs have access to the full content of the memory equipping the machine. However, in SMP, all CPUs access a common memory at the same speed. In NUMA, memory on the same processor board as the CPU, i.e., the local memory, is accessed faster than memory on other processor boards, i.e., the shared memory, hence the "non-uniform" nomenclature. As a result, NUMA architecture scales much better to higher numbers of CPUs than SMP. "Cache coherent NUMA" means that caching is supported in the local system.

Predicate: Typically, on a database query, a predicate is a constraint that filters the data records to be retrieved from a relational table. Following the SQL standard, WHERE clause of a SELECT operation define predicates which are logical expressions that can evaluate to: true, false or unknown. The most basic predicate is an equality comparison. For example, if there is a column 'Color' in a relational table, a query on this table may return only those table rows where; e.g., a 'Red' value is indeed present in the 'Color' column. This is accomplished by having a clause as follows: WHERE Color='Red'. All sorts of other comparisons may apply including: different, greater, lower, etc. provided the data on which this applies are consistent for the comparison. For example, if values in a relational table column are quantities of a specific item (qty) a valid clause may be: WHERE qty>=200. Then, in this case, query returns only rows where quantities are greater than or equal to 200. A query may contain one or more predicates so that ranges can be specified.

Probing: Exploring.

Probing Index: Considering a tuple, taking a given value of the tuple and exploring the associated attribute index with it in order to check if there are queries in the query index that would get this tuple as a result tuple.

Query Data Join: The way the invention performs the queries is based on taking the data from the queries, predicates, and then performing join with these data and the actual records from the table using the query indexes.

Query Index, Indexing: Indexes are key-value data structures meant to give faster random access to a given set of data. Typically, data trees can be used as indexes. A query index is an index containing as keys, values coming from the query predicates for a given attribute, i.e.: for a column; and as values, references to the queries. Indexing queries consists in taking the set of active queries, to gather all their predicates, and to create indexes with these data. The number of query indexes built, and the kind of data structure used, is driven by a greedy-algorithm optimizer, an example of which described in FIG. 6.

Replication: To ensure durability, a set of nodes can be configured to host exactly the same data, so that if one fails, there are still active copies of the data available. The nodes form a replication group.

Segment: The memory allocated to each CPU core which is continuously scanned from beginning to end using the Clock Scan algorithm.

Storage Node: One sub system, typically one machine comprising a total of N CPU cores, hosting one controller process in one of the CPU core and, thus, N−1 Clock Scan processes in the remaining cores.

Result Tuple: Considering a query, tuple which matches the query predicates and that will be part of the result set sent to the query-sender.

Scalability: In telecommunications and software engineering, scalability is a desirable property of a system, a network, or a process, which indicates its ability to either handle growing amounts of work in a graceful manner or to be readily enlarged. For example, it can refer to the capability of a system to increase total throughput under an increased load when resources, typically hardware resources, are added. To scale vertically, or scale up, means to add resources to a single node in a system, typically involving the addition of CPUs or memory to a single computer. To scale horizontally, or scale out, means to add more nodes to a system, such as adding a new computer to a distributed software application.

FIG. 1 further illustrates the objective of the invention and compares the behaving that can be obtained with a data store as described in the following specification of the invention to the one of traditional databases.

As already mentioned in the background section throughput and latency guarantees are difficult to make with traditional database systems when the level of updates to handle is growing significantly and/or when highly diverse query workloads have to be processed. Users of traditional relational database systems still expect a constant response time even though they are issuing complex queries. Traditional systems are designed to achieve best performance for every individual query. To this end, they rely on sophisticated query optimizers and skilled administrators for selecting the right indexes and materialized views. Such complex systems are expensive to maintain and do not exhibit predictable performance for unpredictable, evolving workloads thus often failing to meet users' expectations.

FIG. 1 sketches two charts that compare the actual behavior of a data store according to the invention to that of a traditional database. As shown by chart 110, if the update load is light, a well tuned traditional database can support a high query throughput provided the right indexes and necessary materialized views have been implemented to support it. However, the query throughput 112 always drops quickly with an increasing update load. Likewise, as shown in chart 120, the query throughput 122 also decreases rapidly with the number of different query types, as more and more queries then require full-table scans. Obviously, the effects shown in FIG. 1 produce even lower throughput for workloads that combine high query diversity and concurrent updates.

The data store and distributed relational table of the invention is specifically designed to overcome the above limitations. Although a data store according to the invention may be inferior to traditional solutions that have been tuned for a reduced set of query types it does however exhibits good and, more importantly, predictably good performance for all workload types as shown by curves 114 and 124.

As described in the following specification, predictable performance is achieved by implementing a full-scan-only architecture that does not require any indexation of the stored data. A data store according to the invention uses main-memory storage and data partitioning and optionally day-1 heavy parallelization & shared-nothing design to scale-up linearly on multi-core machines. Collaborative, i.e. shared, scans are also employed in order to overcome the memory-bandwidth bottleneck that is most often observed in modern traditional systems where, if memory density has indeed dramatically increased, the memory bandwidth has not improved, by far, at a same pace than processor performances.

Hence, the invention discloses a novel collaborative-scan algorithm, called Clock Scan, to achieve both high query and update throughput with predictable latency. The idea behind the Clock Scan algorithm is to process incoming queries in batches and to model query/update processing as a join between queries and update statements on the one side, and the data store table on the other side. Index nested-loop joins can be made particularly effective because random access is cheap in a computer main-memory. Hence, rather than indexing the table, as done in traditional databases, a data store according to the invention indexes the queries.

The invention is described in details hereafter and illustrated through a particular use case, yet representative of any large computerized platform, i.e., through the description of a Global Distribution System (GDS), an electronic marketplace that forms the backbone of the travel industry. Such a GDS is for example AMADEUS a European world-leading service provider for managing travel-related bookings, e.g. flights, hotels, rental cars, etc. A few GDS's throughout the world share the world's largest airline carriers and many thousand travel agencies use GDS's to integrate their data. The core database in any GDS contains typically tenths of millions of flight bookings. For historical and performance reasons, the authoritative copy of each booking is stored in a BLOB (binary large object) of a few kilobytes, directly accessible through a unique key. For the bookings that need to be kept on-line, this results in a single flat fact table of several hundred gigabytes in size. Such a BLOB table must typically sustain a workload of several hundred updates and several thousand key-value look-ups per second.

Key-value access is sufficient for all transactional workloads faced by the system. However, the system is not adapted to answer the increasing amount of real-time, decision-support queries that select on non-key attributes, for example: "give the number of 1rst class passengers who require a wheelchair and depart from Tokyo to a destination in the US tomorrow". Queries like this are increasingly common though and feature stringent latency constraints, because operational decisions are made based on their results. To support such queries, a GDS typically maintains a growing number of materialized relational views on the BLOB table, some of which are updated in real-time through an event streaming architecture. The very existence of these materialized views implies that there are few joins in the workload. The vast majority of queries are indeed of the form SELECT <Attr1>, <Attr2> . . . FROM <View> WHERE . . . , with occasional aggregation.

The largest existing view is generally a view of flight bookings: one record for every person on a plane, i.e.: the "Ticket materialized view" or just the "Ticket" in the context of the travel industry and of a GDS. A Ticket record, i.e. a single row of the Ticket materialized view, is typically a fixed few hundreds bytes in size, and consists of a few tenths attributes, many of which are flags with high selectivity, e.g., seat class, wheelchair, vegetarian. Since one travel booking may be related to multiple persons and flights, Ticket may contain hundreds of millions of such records.

Ticket materialized view is updated a few hundred times per second, in real-time. Update rates may be many times higher for brief periods, as bad weather or security incidents can cause large bursts of passenger re-accommodation requests. The update load is increasing at a lower rate than the query load, but is already causing severe problems with regard to index maintenance in the current setup.

The view is used in a large number of data services: from generating the passenger list of a single flight to analyzing the customer profile of different airlines and markets, i.e., pairs of <source, destination> airports. Since the system has reached a level of complexity where adding views and indexes is no longer feasible let alone economical, a growing number of queries on Ticket do not match the primary index on <flight number, departure date>.

As a result, more and more queries have to be answered in batch, i.e. off-line, using full-table scans, with a dramatic impact on performance during this period. Other queries which do not match the index and do not allow for batch processing are simply not allowed. As a solution to all these queries that do not warrant a view of their own, the invention proposes, as further explained in the following, a single instance of Ticket.

Although the invention is described through the particular example of a GDS it must be clear to the one skilled in the art that many systems in real-time business intelligence and decision support face requirements similar to those discussed above and in the following description.

Figure 2:
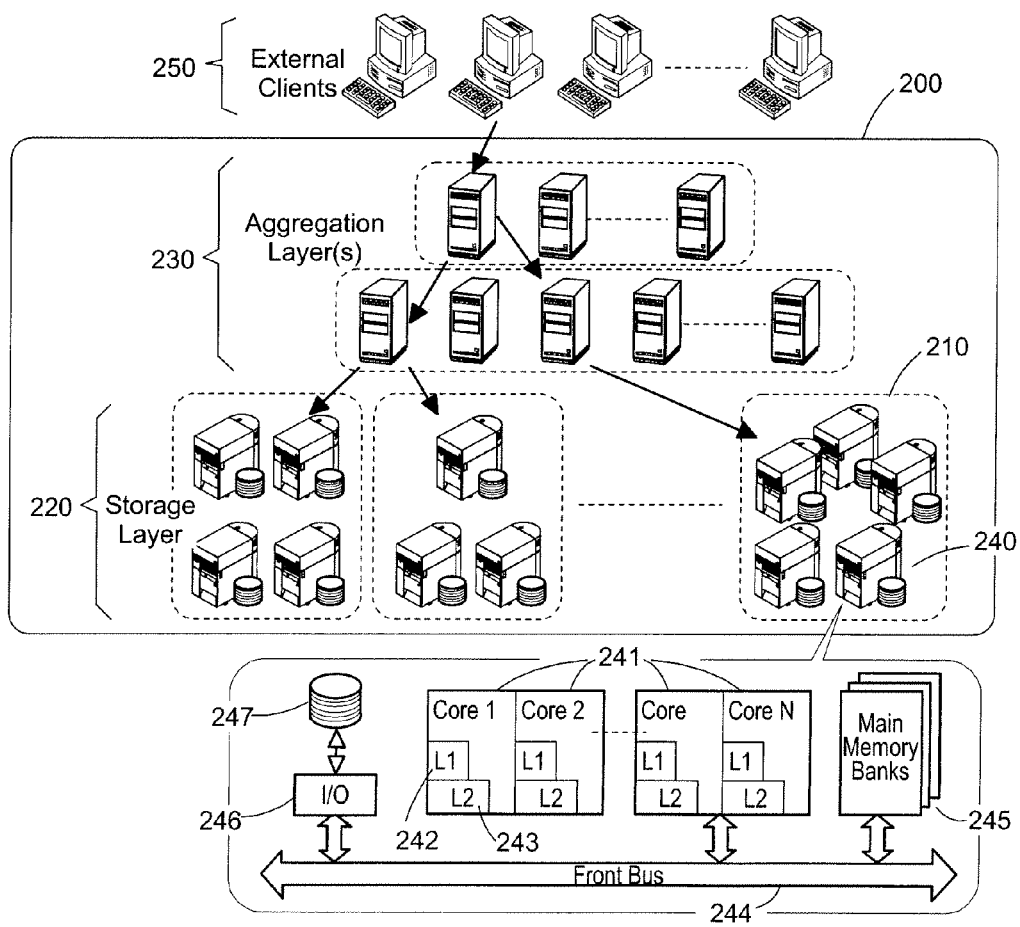
FIG. 2 shows an overview of the computerized distributed environment in which a data store of the invention is operated.

FIG. 2 shows an overview of the computerized distributed environment in which a data store of the invention is operated.

Because main-memory of any computer is necessarily limited, a single machine is generally unable to store the entire table for the large and very large data store applications considered by the invention. So, for scalability and availability, the invention relies on a distributed architecture 200 based on multiple-level horizontal data partitioning and replication.

The invention assumes the data store table is horizontally partitioned between replication groups 210 which consist of individual storage nodes, e.g.: 240. In a replication group, every node contains the same partition of the data store table. The master node of a replication group acts as a workload splitter also called query scheduler, which clusters and forwards incoming queries to different slave replicas based on the queries' selection predicates. This homogenizes the workload at individual replicas, increasing the effectiveness of query indexes, with a result of potentially super-linear scale-out for queries. An operation on the storage nodes is either a query, i.e., a simple SQL-style (Structured Query Language) SELECT statement with optional scalar aggregation or an update, i.e., an INSERT, UPDATE, or DELETE statement.

Updates are not affected, since a replication group operates in a read-one-write-all (ROWA) fashion. Except for load balancing and group membership decisions made by the master, replicas are completely symmetric, which is highly beneficial to fault tolerance. In a traditional architecture, losing a view or index has a dramatic impact on at least part of the workload. In contrast to this, losing a replica in a symmetric architecture causes throughput to decrease by roughly the same predictable degree for all queries.

Together the replication groups form the storage layer 220. The storage layer is also responsible for providing durability. Durability is supported by means of check-pointing and logical logging of the updates. For checkpoints, a background thread is responsible for periodically issuing unpredicated queries, i.e. queries that match all the tuples. The results of these queries are serialized and stored in a flat file, the checkpoint, on a persistent storage, e.g., a hard disk. Considering logging, every update must be appended to the log prior to being confirmed, i.e. write-ahead logging. A background thread periodically, e.g. every second, flushes the log to disk and truncates it to the timestamp of the last checkpoint. This is further discussed in FIG. 7.

Each individual storage node, e.g. 240, is preferably implemented in a multi-core machine. In such a machine each core 241 is an independent processing unit having its own level 1 (L1) cache 242 and level 2 (L2) cache 243; and sometimes a shared level 3 cache (not shown), before interfacing onto an external front bus 244 with main-memory banks 245. A persistent storage is always available generally under the form of a hard disk 247 accessible through an input/output (I/O) controller 246. The time needed to access the stored data from a core increases significantly when going from L1 cache to L2 cache, main-memory and hard-disk. This latter is the persistent storage used to hold the above checkpoints and log files that provide for durability of the data store. The partitioning of the data store relational table is achieved so that one memory segment is assigned to a single processor core. The architecture and operation of a storage node are further discussed in FIG. 3.

One or more layers of aggregator nodes 230 are responsible for routing operations to replication groups, and merging, i.e., aggregating, the results. In traditional architectures, administrators tune performance by providing special views or indexes on one storage node but not on others, or by using entirely different technology for certain replicas, e.g., heterogeneous replication. This is not the case with the invention where replicas are completely homogeneous although replicas can be specialized. For instance, some may be tuned for range queries whereas other can be tuned for equality queries to further improve performances.

Still, processing queries in batches, i.e.: clustering queries based on their selection predicates; is beneficial to performance. For example, assuming that all queries with a selection predicate on flight number go to replica A, while all queries with a selection predicate on airport go to replica B; then, similar queries can be indexed and processed together very efficiently. Clustering decisions are made autonomically at runtime. Query indexes are extremely short-lived, i.e., they only live the time of a scan—typically, less than 2 seconds, so the query clustering can change at any time. Hence, as already discussed, in a traditional architecture, losing a special view or index has a dramatic impact on at least part of the workload. In contrast to this, losing a replica in the system of the invention causes throughput to decrease by roughly the same predictable degree for all queries. This enables predictable performance in high availability setups without additional data redundancy.

The middleware aggregation layer 230 is thus responsible for the instrumentation and orchestration of the storage layer. It defines the way data is partitioned across storage nodes. System of the invention imposes no restrictions on how partitioning is performed. The implementation of the system decides if the mapping of tuples to storage nodes is random i.e. round-robin partitioning or unique i.e. hash partitioning or partition by specific criteria, e.g. all vegetarians are stored in one specific storage node. The aggregation layer merges, i.e., aggregates the results generated by the storage nodes thus allows processing of aggregating queries, i.e., queries involving ranges of values requiring computations including, e.g.: summing attribute values, finding an attribute minimum and maximum value. Thus, when an end-user asks for a sum/min/max/count to be computed, then all the storage nodes process the sum/min/max/count for their segment set, and then the aggregation layer only aggregates the sub-aggregation results. This is a multi-level aggregation scheme which may also comprise a controller of scan threads which aggregates the aggregated data.

During this operation the aggregation layer should wait for confirmations or rejections from all storage nodes that were involved in evaluating an operation before sending the confirmation to the client. For updates, the confirmation is a write confirmed or write rejected message. For queries the confirmation is a special end-of-results message, which declares that no more tuples are going to be sent for the given operation. The aggregation layer may contain any number of aggregator nodes, in one or multiple levels. In a multi-level aggregation setup, an aggregator node is used to partition the data store table across a set of aggregator nodes and merge their results. In order for recursive, that is to say multi-level, aggregation to be feasible, the interface of an aggregator layer should match the interface of a storage node. The invention requires that all aggregation nodes be totally stateless. The lack of state allows the system administrator to add as many aggregator nodes as required in order to support the workload. It also removes the complexity of handling aggregation node failures. The upper layer, i.e., the clients' layer 250 is expected to know a set of aggregator nodes, to which it is able to send operations. An aggregator node that fails to confirm or reject consecutive operations must be considered as being off line.

FIG. 3 visualizes the storage node architecture according to the invention. Storage nodes expose two main functions: enqueue an operation, and dequeue a result tuple. Rather than enqueuing an operation and waiting for the result, the users, i.e., the aggregator nodes, are expected to concurrently enqueue a large number of operations and to asynchronously dequeue results. Each aggregator node in turn may thus serve thousands of external clients.

Once inside a storage node, an operation 310 is split 320 and put into the input queue of one or more scan threads 330. Each scan thread is a user-space thread with hard processor affinity which continuously scans a horizontal partition of the data store table stored in a dedicated partition of a memory core, i.e., a segment as already defined. Scan threads periodically remove operations from their input queue 325 and activate them i.e. queries are ready to be processed and fulfilled. At any given moment, a scan thread may have multiple active operations. As a scan thread executes its set of active operations against the records under the scan cursor, it generates a stream of result tuples 335 which are further merged 340. Once an operation has completed a full scan of a table partition, the scan thread puts a special end-of-stream tuple on the output queue 350 and deactivates the operation.

Although this architecture raises questions with regard to fairness: "cheap" versus "expensive" queries, and resource utilization: busy versus idle threads, the fact that every operation takes roughly the same time is a key feature and a strong type of fairness. Moreover, the invention relies on the law of big numbers: the more operations share a scan cursor, the more they are representative of the workload as a whole, thereby balancing the load across scan threads 330. This allows thousands of operations to share a scan cursor.

The physical memory is partitioned into disjunct, i.e.: non-overlapping segments which are assigned to dedicated processor cores. This technique is referred to as segmentation. Each core runs a single scan thread with hard affinity, i.e., threads do not migrate between processors. This shared-nothing architecture enables linear scale-up because of the following key properties:

- There is no locking because a scan thread is guaranteed to be the only one updating records in its segment, execution can proceed without any locks or latches.
- Maximum cache coherency is achieved since distinct processor caches never contain a copy of the same record, so they are implicitly coherent in this performance-critical respect. Records need not be written back to main memory until the scan cursor moves on, even if they are modified.
- Minimum NUMA distance is obtained because scan threads have hard processor affinity and because source code is written so that memory allocation is performed on the local NUMA node and not on a remote NUMA node. Their respective memory segments are uniquely associated with a processor. This is critical on NUMA architectures. Using segmentation, CPUs never access each other's local memory except for passing operations and operation results, giving maximum memory bandwidth and minimum access latency where it matters: predicate evaluation.

Under these conditions memory bandwidth is no longer a bottleneck as in traditional databases. Scan algorithms of the invention are CPU, i.e., processor bound under load.

FIG. 4 discusses the algorithm which continuously scans the data in a separate thread of control and compares the scan algorithm of the invention, shown in FIG. 4b, to algorithms of the prior art shown in FIG. 4a.

The invention discloses a novel collaborative-scan algorithm, called Clock Scan. The Clock Scan algorithm batches incoming queries and models query/update processing as a join between the queries and update statements on the one side and the table on the other side. Instead of indexing the data of the table, Clock Scan creates temporary indexes of the queries and updates that are currently being evaluated. For main-memory, this setup is particularly effective, since random access is cheap. It is compared to state of the art algorithms hereafter referenced to as Classic Scan and Elevator Scan.

As shown in FIG. 3 all scan algorithms 330 continuously scan the data in a separate thread of control. Also, the algorithms operate on slots of fixed-sized records. Extending the invention to variable sized records or different record layouts would affect the algorithms to some degree, but poses no conceptual problems, since there are no auxiliary data structures, and records can be arranged freely.

A straightforward algorithm here referred to as Classic Scan is shown in FIG. 4a under the name of "Algorithm 1" 410. This is a straightforward "classic" implementation of the split-scan-merge pipeline shown in FIG. 3. In this case each scan thread only processes one incoming operation at a time. The Execute function of an operation first checks whether the slot is occupied. If it is not, and the operation is an INSERT, a record is inserted into the slot following a "first fit" policy. If the slot is occupied, and the operation is not an INSERT, the operation's selection predicates are evaluated. If all predicates are satisfied, the function either puts a result tuple on the output queue as a result of a SELECT operation, or modifies the slot if an UPDATE or DELETE is performed. After processing all records, Classic Scan puts a special end-of-stream tuple on the output queue and proceeds with the next operation from the input queue. The asymptotic runtime of Classic Scan is O(n*m) for n operations over m slots. Obviously, it takes little advantage of the computational resources of modern processors, as it makes essentially no use of the caches.

Elevator Scan is also shown in FIG. 4a under the name of "Algorithm 2" 420. This is a first improvement over Classic Scan. Zukowski et al. (reference: M. Zukowski et al.; Cooperative scans: Dynamic bandwidth sharing in a DBMS; In Proc. VLDB'07, 2007) and Raman et al. (reference: V. Raman et al. Constant-time query processing; in Proc. ICDE'08, 2008) have previously investigated variants of Elevator Scan for read-only workloads in disk-based and main-memory databases respectively. Algorithm 2 shows an exemplary generalization of Elevator Scan for mixed workloads.

Elevator Scan maintains a queue of active operations which are executed, in arrival order, against the slot under the scan cursor before moving on to the next slot.

Algorithm 2 updates the active queue at every slot. All active operations which have finished a full scan are deactivated, and the input queue is flushed. This exemplary implementation of the algorithm does this only at chunk boundaries which are equivalent to blocks in a disk-based database. Like blocks, chunks are stored next to each other. Also, it splits the active queue into multiple queues of different type, to avoid executing DELETEs on an empty slot, for example.

Elevator Scan is a so-called cooperative scan, in that it lets multiple operations share the scan cursor to improve cache locality and avoid creating a memory access bottleneck (reference: W. A. Wulf and S. A. McKee; Hitting the memory wall: implications of the obvious. ACM SIGARCH Comput. Archit. News, 23(1):20-24, 1995; and reference: P. A. Boncz et al. Database architecture optimized for the new bottleneck: Memory access. In Proc. VLDB '99, 1999.). However, the asymptotic runtime of Elevator Scan is still O(n*m) for n operations over m slots.

The scanning algorithm of the invention, i.e.: Clock Scan is shown in FIG. 4b under the name of "Algorithm 3" 430.

Even though Elevator Scan improves upon the cache behavior of Classic Scan, this improvement is at most a constant factor in runtime. In contrast, Clock Scan performs query/update-data joins over sets of queries/updates to allow asymptotic runtime improvements. FIG. 4b discusses the scan algorithm itself. Query/update-data joins are covered in detail in next figure.

It is known that interleaving the evaluation of multiple select predicates is useful for low-level optimizations. Indeed, interleaving the evaluation of multiple operations may create additional opportunities for maximizing cache-locality. However, in the presence of writes, unconstrained reordering and interleaving of active operations may compromise consistency. Clock Scan thus makes the distinction between read and write operations and batches independently the execution of each class of read or write operations. This creates a large interleaving opportunity for reads even under a heavy write workload.

A high-level illustration of the algorithm idea 440 is shown in FIG. 4b. The algorithm continuously run two circular scans over the segment: one read scan 442, one write scan 444. The read cursor cannot pass the write cursor and vice versa, i.e., the read cursor is always some delta less than one cycle behind the write cursor. The write cursor executes operations strictly in arrival order. It can be proven easily that the read cursor will always see a consistent snapshot if the algorithm only activates operations at record 0, regardless of the order in which queries are executed. Clock Scan, given in Algorithm 3, actually merges the two logical cursors into a single physical one for higher cache locality. At each iteration of the infinite loop, it first flushes the input queues and creates join plans for the active queries and updates. Then, it performs the actual chunk-wise scan of the segment, joining each chunk of records with the set of queries and the set of updates.

The Clock Scan algorithm not only reorders operations, but truly interleaves their execution by performing query/update-data joins. In this context, a join is any evaluation of predicates against records which yields the same set of result tuples as if executing every query/update on every record. The task of finding the best possible join strategy, i.e. the best possible multi-query-plan, is delegated to a multi-query optimizer. A simple yet effective implementation of such a multi-query-optimizer is described in FIG. 6. The runtime complexity of Clock Scan is determined by the joins.

Figure 5B:
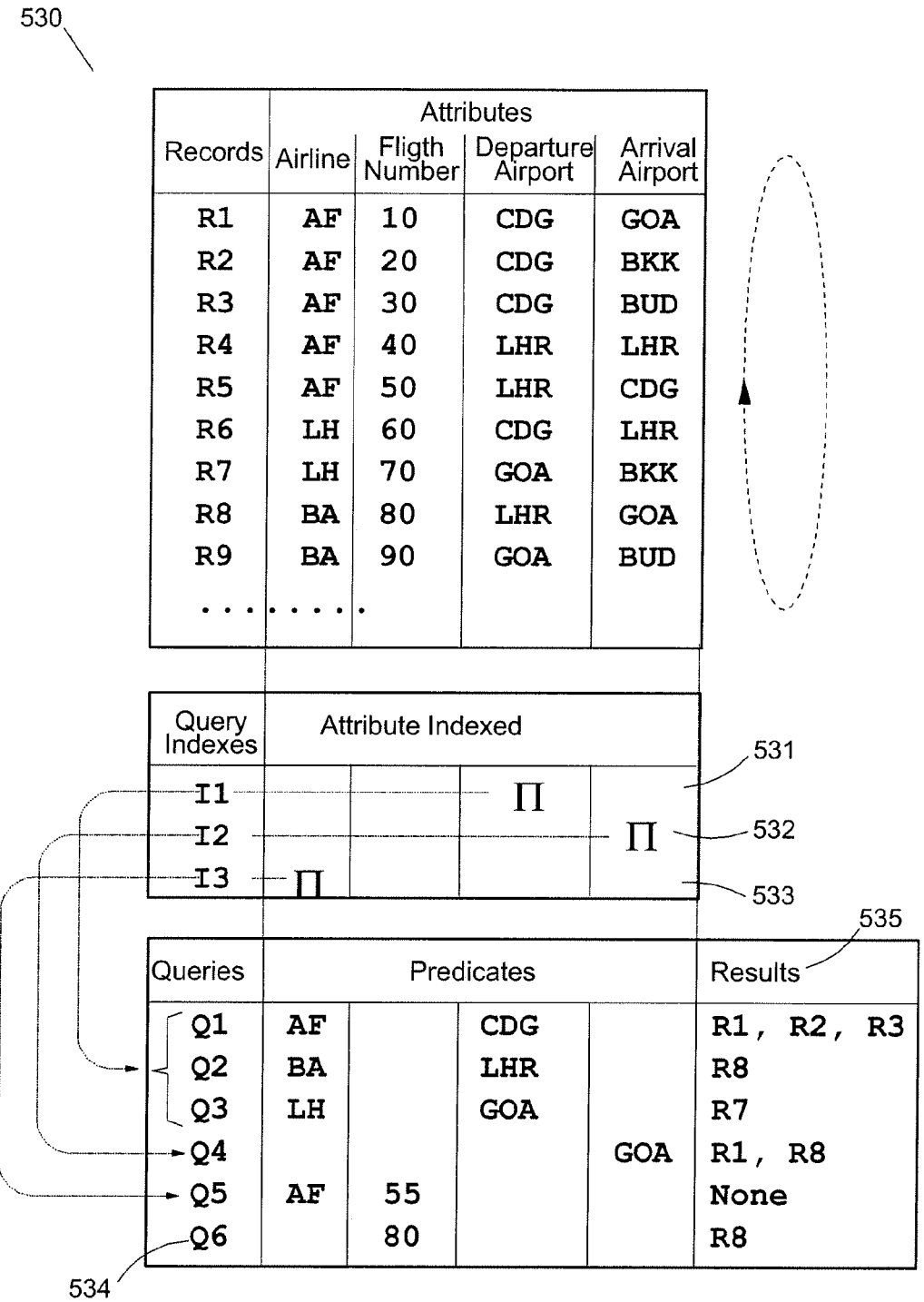
FIG. 5 discusses two types of join algorithms, namely: "Index Union Join" and "Index Union Update Join" and shows an example of how queries are indexed.

FIGS. 5a, 5b and 5c discuss two types of join algorithms, namely: "Index Union Join" and "Index Union Update Join". Clock Scan allows asymptotically better performance than Elevator Scan because, as mentioned above, it reorders and interleaves queries to perform query/update-data joins. The term query-data join has been coined by Chandrasekaran et al. (reference S. Chandrasekaran and M. J Franklin: Streaming queries over streaming data. In Proc. VLDB '02, 2002) and is based on the idea of interpreting a set of pending queries as a relation of predicates. The two join algorithms are discussed hereafter.

A flexible and general solution of the invention to implement union join is to index predicates. Hence, a cache-conscious query-data join based on short-lived predicate indexes: Index Union Join 510 is implemented as "Algorithm 4" shown in FIG. 5a. Cache consciousness is achieved by forcing scan thread to execute in a designated computational core thus creating hard affinity; and by fetching data from the relational table segment in chunks of size compatible with one or more levels of memory caches dedicated to the designated computational core to prevent cache misses. Hence, cache consciousness is a way of programming where at each new line of source code one has to consider how cache usage is impacted. It is thus not only an OS/hardware matter but mainly an aspect that drives how the source code is written.

A predicate index maps a single attribute value to a set of queries. For example, the three queries $q_1$: age=12, $q_2$: age=27, and $q_3$: age=27 could be indexed in a multi-hash map that returns $\{q_2; q_3\}$ when probed with a record with age=27. Range predicates such as 30<age<50 can be indexed in any spatial index structure that supports stab or stabbing queries, i.e., queries issued in computational geometry, pattern matching, and other applications where there is a need to quickly determine which of a collection of intervals overlap a point. Such a structure is, e.g., the "Interval Skip List", a data structure aimed at finding all intervals that overlap a point.

FIG. 5a visualizes the data structure 520 of Index Union Join. There exists exactly one access path to each query. Either one of the query's predicates is part of a predicate index, or the query is part of the set of unindexed queries. Since this constitutes a partitioning of the set of queries, following every access path, i.e., every index plus the set of unindexed queries, with every record, and unioning the result tuples, yields the same result relation as executing every query against every record. Algorithm 4 follows straight from this observation. Note that putting all the results of executing queries into a common output queue gives union semantics.

The worst-case runtime complexity of Index Union Join, i.e., every record matches every index, is no better than executing every query against every record, as done by Classic Scan and Elevator Scan. However, Index Union Join is faster for any reasonably selective set of predicates, because probing an index immediately takes all non-matching queries out of consideration. Runtime is dominated by the cost of probing the index, which is constant or logarithmic. This is analogous to the difference between a nested-loop join and an index nested-loop join in traditional query processing. For large sets of queries, the resulting speed-up is significant.

Different to the given pseudo-code describing Algorithm 4, the actual optimized implementation vectorizes the index probing, i.e., it passes the entire chunk to an index' probe function instead of a single record. This gives significantly higher data and instruction cache locality.

In terms of indexes, the invention currently implements a jagged array for attributes with small domain (e.g.: gender), a chained hash index with linear probing for equality predicates, as well as a packed 1-dimensional R-Tree (reference: A. Guttman; R-trees: a dynamic index structure for spatial searching; in Proc. SIGMOD'84, 1984) for range predicates. These simple index structures turned out to have better performance than some other more complex structures due to their high data and instruction cache locality.

A simple example 530 of indexing queries is shown in FIG. 5b. The query optimizer may decide, for example, on the basis of internal statistics gathered by a scan thread, and by analyzing the particular query set, that three query indexes are needed. First, in this case, all queries having a predicate on "Departure Airport" attribute are indexed together with a first index 531. Then, all remaining queries having a predicate on "Arrival Airport" attribute are indexed together into a second index 532. Finally, a last index with queries predicating on "Airline" attribute are indexed together into index 533. The last query Q6 534 is estimated by optimizer not worth to be indexed. Hence, multiple records 535 are possibly retrieved quickly thanks to indexing.

Index Union Update Join 540 is implemented as "Algorithm 5" shown in FIG. 5c. Under a heavy update load, it is convenient to use predicate indexes also for updates. The problem is that updates have to be executed in serialization order and are expressed as timestamps. What makes this hard to do efficiently is the fact that a slot's state may change after each update, thereby changing the set of matching updates.

Index Union Update Join given in Algorithm 5 solves the problem. It maintains a queue iq of unindexable INSERTs, and a set of predicate indexes is, while us contains unindexed UPDATEs and DELETEs.

The function PerfUpdates 550 is an extension of the Index Union Join shown in the previous section. It collects a set M of all updates matching s records. Then, it looks for the update u belonging to M with the lowest timestamp greater or equal to t, if any, and executes it. The variable t is initially 0 and ensures updates are executed in timestamp order as follows. If u was a DELETE, recursion ends because the slot is empty. Otherwise, the function recurses for t=u.timestamp+1. This ensures that no update v where v.timestamp is equal or greater than u.timestamp will be executed on the updated record, even though v remains in the indexes and may repeatedly appear in M as the function recurses.

Index Union Update Join proceeds to the next slot when t becomes greater than any legal timestamp. This happens if and only if the slot is occupied but no matching update with a timestamp smaller or equal to t exists, or the slot is empty but no insert operations remain in iq.

As for performance, it can be noted that in the worst-case, there are only UPDATEs to be joined, and each of those n UPDATEs matches every record, every time PeriUpdates is called. Since IMI is smaller or equal to n, the depth of the recursion is up to n and the worst-case runtime complexity for m records is $O(n^2*m)$. In reality, M will typically contain 0 or 1 update, so runtime is dominated by the cost of probing the indexes, which is constant or logarithmic in n. In our optimized implementation, the "recursion" is just an assignment to t and a goto-statement.

FIG. 6 discusses the multi-query optimizer aimed at planning the joins described in previous figure. The term multi-query optimization traditionally refers to the practice of finding common sub-expressions among a set of queries, with the goal of sharing and pipelining intermediate results, i.e., partial selections and joins, in a global (multi-)query plan (reference: T. K. Sellis; Multiple-query optimization; ACM TODS, 13(1):23-52, 1988; and reference: S. Harizopoulos et al.; Qpipe: A simultaneously pipelined relational query engine; in Proc. SIGMOD'05, 2005). Such an approach is useful for small sets of long-running, complex queries.

In contrast to this, the invention is designed for large sets of short-running, simple queries. The optimization problem consists here in finding a set of predicate indexes which minimize the cost, i.e. runtime, of the join algorithms given previously. Also, multi-query optimization really means here queries and updates, since they are indexed in exactly the same way. In any case, the problem is NP (non-deterministic polynomial-time) hard, as the special case "find the minimum set of predicate indexes to cover all queries/updates" is already an instance of minimum set covering.

Given the short lifetime of a query/update plan, typically 1 second, finding an optimal solution is not possible. So instead, the optimizer uses a greedy algorithm, i.e.: "Algorithm 7" 610. At each iteration, algorithm builds an index on the attribute that gives the highest gain, and then takes all queries/updates that are covered by the index out of consideration. The Gain function 620 is defined as shown in FIG. 6.

It is based on the following idea. Touching a query/update q is associated with a certain overhead i.e. branching, accessing attribute values, etc., that must be avoided. The probability of touching q after probing a predicate-index on a is q's selectivity with respect to a. If q does not have a predicate on a that probability is 1. The gain is then the expected number of operations in Q that do not have to be touched given an index on a. Obviously, maximizing this number minimizes the number of operations expected to be touched. The empirically obtained value thresh (2.5) prevents the optimizer from building more indexes than beneficial.

To compute the gain metric and pick a suitable set of predicate indexes, the optimizer requires an estimate of the selectivity of each predicate. The invention keeps a small set of internal statistics that can be efficiently maintained by just scanning the data: number of records, number of null values for each attribute, and number of distinct values for each attribute. For computing these internal statistics, the invention employs a simple yet effective technique known as linear or probabilistic counting (reference P. Flajolet and G. N. Martin; Probabilistic counting algorithms for data base applications; J. Comput. Syst. Sci., 31(2):182-209, 1985. and reference: K.-Y. Whang et al.; A linear-time probabilistic counting algorithm for database applications; ACM TODS, 15(2): 208{229, 1990.). The probabilistic counting algorithm is implemented as a side-effect of a periodical statistics query, which to the scan algorithm is just an unconditional query.

FIG. 7 discusses about durability.

For durability, the invention uses a combination of writeahead logging and checkpointing. At any time, a checkpoint is maintained on disk in the form of a fuzzy snapshot 710, i.e., a set of timestamped snapshots of each memory segment 720, which are obtained through unconditional snapshot queries 735. When executed against a record, snapshot queries copy the record to a flip buffer 730 which asynchronously writes the records back to disk.

By scheduling snapshot queries on segments in a round-robin fashion, n+1 segments of disk space are sufficient to always have a checkpoint of n segments of memory. The constant-size flip buffer ensures predictability. The data is written to disk by the controller thread.

After a crash, recovery proceeds concurrently for each segment. First, the snapshot segment is loaded from disk, and then the log is replayed. A logical redo-log is implemented which is extremely efficient, but also implies an auto-commit mode i.e., there is no commit and no rollback managed by the system. System performs what user asks without ability to confirm/cancel. An extension to full atomicity is obtained by adding a physical log and an undo phase to log replay.

Figure 8:
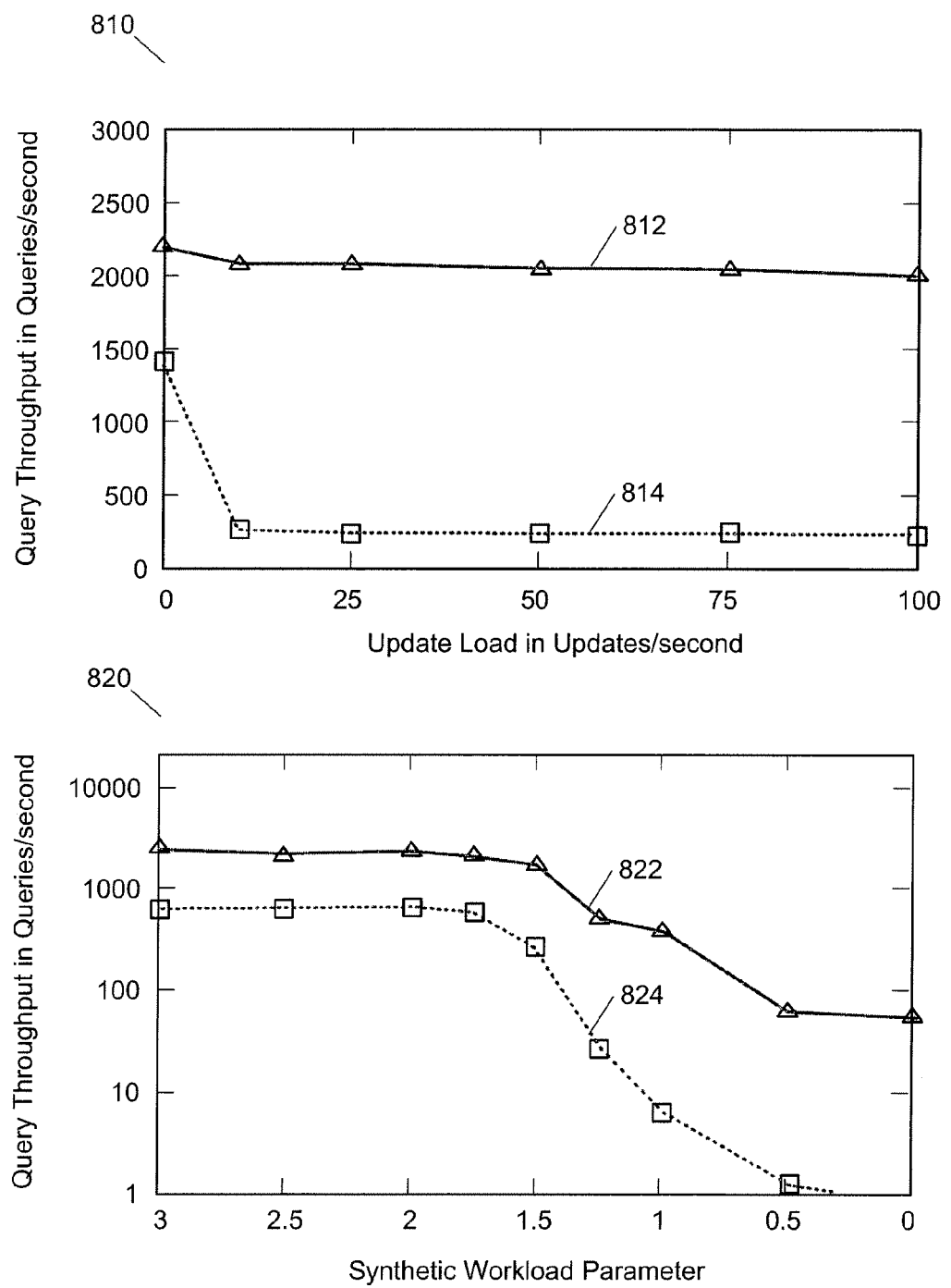
FIG. 8 shows experimental results.

FIG. 8 shows experimental results that are in line with the objective of the invention discussed in the background section and in FIG. 1. The results obtained with a data store of the invention are compared to the ones of a commercially available relational database which has been tuned so that a fair comparison applies.

The experiment has been conducted on a 16-cores machine of the type expected to be used to implement the storage nodes. It was built from four quad-core commercially available processors with 32 GB (Giga Bytes, i.e.: $2^{30}$ bytes) of main-memory made of RAM (Random Access Memory) modules having a DDR2 (Double Data Rate) output bus running at 667 MHz (Mega Hertz, i.e.: $10^6$ Hertz). A cumulative memory bandwidth of over 42 GB/second was then available. Each core had a 2.2 GHz ($10^9$ Hertz) clock frequency, a L1 cache with twice 64 KB ($2^{10}$ Bytes) of memory for data and instruction, and a 512 KB L2 cache. The machine was running a 64-bit Linux SMP (symmetric multiprocessing) kernel as operating system (OS). The experiment has been run from a 15 GB data store table of the kind discussed previously, i.e., the "Ticket" view used in the travel industry by a GDS like AMADEUS.

To verify that the objectives of the invention are met the maximum query throughput, in queries/second, has been measured for a mixed workload of the kind used by above GDS with variable update loads. This corresponds to graph 810 where curve 812 is relative to the invention and shows that the query throughput is hardly affected by the number of concurrent updates, in a range 0-100, while curve 814, for the commercial database, drops sharply as soon as more than a few updates per second are performed.

Also, the throughput for a synthetic variable read-only workload has been measured as shown on graph 820 where throughput is plotted against a parameter of the synthetic workload that is representative of the query diversity. While the commercial database query throughput 824 comes close to the one of the invention for standard workloads it drops then significantly faster than the one of the invention 822. More interesting than the absolute numbers are the shapes of the curves. They indeed match those of FIG. 1.

The invention thus meets the objective assigned and guarantees significantly higher throughput and lower latency numbers with minimum administration effort, even if the workload is fluctuating or rapidly evolving. If necessary, throughput and latency goals can be met simply by adding hardware alone, owing to scalability of a data store according to the invention.

In summary, as a single storage node, the invention is a data management system providing predictable performance for unpredictable workload thus allowing real time data mining. To this end, it is a lock-free and index-free architecture capable of executing massive non-SQL analytic queries with predictable performance on a single relational table.

It is also a main-memory data management tool based on cooperative full scans. Data handled by the tool are not indexed, but the queries/operations predicates are, both read and write workloads, and then processed in batches.

A storage node according to the invention is consistent at segment level. A segment being the dataset dedicated to a given Clock Scan algorithm run by a CPU core. Consistency means that any read request will either see a given write request fully applied to the segment or not at all. To achieve this two cursors are used: the first one being responsible for the writes, and the second one for the reads. The configuration where queries/operations are only activated at the beginning of a scan, i.e., at record 0, guarantees that above consistency is met.

Efficiency is first obtained from query/operation indexing. To this end, different kinds of indexes are created based on the query operators supported. Thus, for equality or for range, different indexes are built. Efficiency is also obtained through the use of hard-affinity, minimization of NUMA distances, and cache conscious query indexing and processing in the context of continuous data full scans.

Full scans moreover allow the gathering of small sized internal statistics with probabilistic counting on number of records, number of null values and number of distinct values that can be efficiently used for CPU cache management and building of query/operation indexes. The full scan based approach is also beneficial to durability since it allows fuzzy check pointing to be performed with low overhead on the system. Aggregation of queries such as: sum, count, max or min, can be efficiently executed too.

As a distributed system the invention extends the single storage model to allow scalability, availability, large scale partitioning, and node specialization. To achieve this, an aggregation layer is implemented for the purpose of routing the queries to the appropriate storage nodes and merging the results coming back from them. Hence, scalability is achieved since aggregation layer allows farms with hundreds of storage nodes to be build which can store much larger data sets than a single node.

Availability is obtained because storage nodes are organized in replication groups where each machine of the group hosts same data. Then, if a machine becomes defective, the data would still be available from the other replicas of the group.

Large scale horizontal partitioning is achievable through multiple replication groups which host different data. Then, the routing nodes of the aggregation layer can, if the query is expressive enough, skip some replication groups; thus, not sending them a query that is known would not return results for this query. Different strategies of partitioning are then possible.

Node specialization can also be carried out. Nodes within a replication group can be configured differently even if they host the same data. For instance, some nodes may have appropriate structures to process better the range queries, and other nodes can build structures to process better equality-like predicates.

What is claimed is:

1. A method for accessing data in a data store, the data store comprising at least one storage node, the storage node including a plurality of processor cores coupled to a memory, and the storage node configured to store a plurality of segments of a table in the memory, wherein each of the plurality of segments includes a plurality of data records from the table and is respectively associated with a processor core from among the plurality of processor cores, wherein the plurality of processor cores includes a first processor core and the plurality of segments includes a first segment associated with the first processor core, the method comprising:
  running, from each processor core of the storage node, a scan thread dedicated to continuous and full scanning of the segment respectively associated with such processor core, including running, from the first processor core, a first scan thread dedicated to continuous and full scanning of the first segment;
  receiving and queuing a plurality of table operations at the storage node; and
  in the first scan thread, processing a batch of received and queued table operations with the first scan thread by:
    scanning through each data record of the plurality of data records in the first segment; and
    when scanning through each data record, applying each of the table operations of the batch to such data record.

2. The method of claim 1, wherein the batch of table operations includes query operations and update operations.

3. The method of claim 2, wherein processing the batch of received and queued table operations includes:
  joining the query and update operations of the batch to retrieve data records of the first segment that match with predicates of the query operations and the update operations; and
  progressively fulfilling the query operations and the update operations of the batch when the data records are retrieved by the first scan thread while scanning the first segment.

4. The method of claim 2, wherein the first scan thread executes a clock scan algorithm that includes a write cursor and a read cursor that scans the first segment in order to process, at each scan cycle, respectively, all of the query operations and the update operations of the batch, wherein the write and read cursors cause the data records of the first segment to be written before the read cursor reads the data records of the first segment, wherein all of the query operations are activated at beginning of each scan cycle, and wherein all of the update operations are either fully applied or not at all applied to the data records of the first segment.

5. The method of claim 2, wherein the update operations include modifying, deleting, or inserting the data records from the first segment or into the first segment.

6. The method of claim 2, wherein processing the batch of received and queued table operations further includes generating an index from the table operations of the batch, wherein scanning through each data record of the plurality of data records in the first segment is performed after generating the index, and wherein applying each of the table operations of the batch is performed using the index.

7. The method of claim 6, further comprising:
  while scanning the first segment, gathering internal statistics by the first scan thread to count a number of data records, a number of null values, and a number of distinct values currently found for a given attribute of the first segment, wherein generating the index includes using the internal statistics to generate the index.

8. The method of claim 7, wherein the first scan thread counts the number of data records, the number of null values, and the number of distinct values currently found for the given attribute of each segment.

9. The method of claim 6, further comprising:
  building internal statistics based on contents of the data records in the first segment, wherein generating the index includes building a plurality of query indexes of different types based upon the internal statistics.

10. The method of claim 2, further comprising:
  extracting values from the data records while scanning the first segment;
  performing at least one of the calculations: summing attribute values, finding an attribute minimum value and an attribute maximum value, and counting a number of non-null values; and
  fulfilling a query by providing the result of the at least one of the calculations.

11. The method of claim 2, further comprising:
  building, by the first scan thread, a snapshot of the data records while scanning the first segment; and
  storing the snapshot of the data records in a durable memory.

12. The method of claim 11, further comprising:
  maintaining, by the first scan thread, a logical log file of current transactions in the durable memory while scanning the first segment.

13. The method of claim 12, further comprising:
  obtaining a durability of the main memory by reloading the snapshot and replaying the logical log file of the current transactions.

14. The method of claim 13, wherein the first segment stays resident in the memory at the first processor core.

15. The method of claim 14, further comprising:
  fetching the contents of the data records from the first segment in chunks of size compatible with one or more levels of memory caches dedicated to the first processor core.

16. The method of claim 1, further comprising, in the first scan thread, generating the batch of received and queued table operations from table operations currently pending at a beginning of a scan cycle for the first scan thread.

17. The method of claim 1, wherein the plurality of processor cores includes a second processor core, the plurality of segments includes a second segment associated with the second processor core, and a second scan thread dedicated to continuous and full scanning of the second segment runs on the second processor core, the method further comprising:
  in the second scan thread, processing the batch of received and queued table operations with the second scan thread by:
    generating an index from the table operations of the batch;
    scanning through each data record of the plurality of data records in the second segment after generating the index; and
    when scanning through each data record, applying each of the table operations of the batch to such row using the index.

18. The method of claim 17, wherein receiving and queuing the plurality of table operations at the storage node includes storing the plurality of table operations in respective input queues for each of the first and second scan threads, the method further comprising:
  streaming result tuples generated by each of the first and second scan threads to respective output queues; and
  merging the result tuples from the output queues.

19. A data store, comprising:
- a storage node including a plurality of processor cores coupled to a memory, and the storage node configured to store a plurality of segments of a table in the memory, wherein each of the plurality of segments includes a plurality of data records from the table and is respectively associated with a processor core from among the plurality of processor cores, wherein the plurality of processor cores includes a first processor core and the plurality of segments includes a first segment associated with the first processor core; and
- a plurality of scan threads respectively running on the plurality of processor cores of the storage node, each scan thread dedicated to continuous and full scanning of the segment respectively associated with the processor core among the plurality of processor cores upon which such scan thread is running, the plurality of scan threads including a first scan thread running on the first processor core and dedicated to continuous and full scanning of the first segment;
- wherein the storage node is configured to receive and queue a plurality of table operations; and
- wherein the first scan thread is configured to process a batch of received and queued table operations by:
  - scanning through each data record of the plurality of data records in the first segment; and
  - when scanning through each data record, applying each of the table operations of the batch to such data record.

20. The data store of claim 19, wherein the batch of table operations includes query operations and update operations.

21. The data store of claim 20, wherein the first scan thread is configured to process the batch of received and queued table operations further by:
- joining the query and update operations of the batch to retrieve data records of the first segment that match with predicates of the query operations and the update operations; and
- progressively fulfilling the query operations and the update operations of the batch when the data records are retrieved by the first scan thread while scanning the first segment.

22. The data store of claim 20, wherein the first scan thread executes a clock scan algorithm that includes a write cursor and a read cursor that scans the first segment in order to process, at each scan cycle, respectively, all of the query operations and the update operations of the batch, wherein the write and read cursors cause the data records of the first segment to be written before the read cursor reads the data records of the first segment, wherein all of the query operations are activated at beginning of each scan cycle, and wherein all of the update operations are either fully applied or not at all applied to the data records of the first segment.

23. The data store of claim 20, wherein the first scan thread is configured to process the batch of received and queued table operations further by generating an index from the table operations of the batch, wherein the first scan thread is configured to scan through each data record of the plurality of data records in the first segment after generating the index, and wherein the first scan thread is configured to apply each of the table operations of the batch using the index.

24. The data store of claim 23, wherein the first scan thread is further configured to, while scanning the first segment, gather internal statistics to count a number of data records, a number of null values, and a number of distinct values currently found for a given attribute of the first segment, and wherein the first scan thread is configured to generate the index using the internal statistics.

25. The data store of claim 20, wherein the first scan thread is further configured to build a snapshot of the data records while scanning the first segment and store the snapshot of the data records in a durable memory, and wherein the first segment stays resident in the memory at the first processor core.

26. The data store of claim 19, wherein the plurality of processor cores includes a second processor core, the plurality of segments includes a second segment associated with the second processor core, and a second scan thread dedicated to continuous and full scanning of the second segment runs on the second processor core, the second scan thread configured to process the batch of received and queued table operations with the second scan thread by:
- generating an index from the table operations of the batch;
- scanning through each data record of the plurality of data records in the second segment after generating the index; and
- when scanning through each data record, applying each of the table operations of the batch to such row using the index.

27. The data store of claim 26, wherein the storage node is configured to store the plurality of table operations in respective input queues for the first and second scan threads, the storage node further configured to:
- stream result tuples generated by each of the first and second scan threads to respective output queues; and
- merge the result tuples from the output queues.

\* \* \* \* \*